United States Patent [19]

Caldwell

[11] Patent Number: 4,465,175
[45] Date of Patent: Aug. 14, 1984

[54] CONTAINER ORIENTING APPARATUS

[75] Inventor: David L. Caldwell, Lavalette, W. Va.

[73] Assignee: Owens-Illinois, Inc., Toledo, Ohio

[21] Appl. No.: 429,930

[22] Filed: Sep. 30, 1982

[51] Int. Cl.³ .............................................. B65G 47/24
[52] U.S. Cl. ..................................... 198/399; 198/416
[58] Field of Search ............... 198/394, 399, 416, 400, 198/415, 624

[56] References Cited

U.S. PATENT DOCUMENTS

| 3,493,096 | 2/1970 | Antoszewski et al. | 198/399 X |
| 4,149,621 | 4/1979 | Sollenberger et al. | 198/399 X |
| 4,308,943 | 1/1982 | Gierhart | 198/399 |

FOREIGN PATENT DOCUMENTS

| 903524 | 2/1954 | Fed. Rep. of Germany | 198/399 |
| 2524920 | 12/1976 | Fed. Rep. of Germany | 198/399 |
| 3016940 | 11/1981 | Fed. Rep. of Germany | 198/415 |
| 52-51665 | 4/1977 | Japan | 198/394 |

Primary Examiner—Robert J. Spar
Assistant Examiner—Jonathan D. Holmes
Attorney, Agent, or Firm—Gerald T. Welch; Myron E. Click

[57] ABSTRACT

Apparatus including a continuously traveling conveyor belt upon which containers which have dissimilar opposed panels are carried in line singly through a zone where the containers are separated from each other a small amount and then are permitted to pass in single line through the orienting device which, in those cases where the container is properly oriented, will permit the container to travel undisturbed through the orienting area. In the event the container arrives at the orienting position with its panels in the wrong directions, the container will be turned through 180° about its vertical axis by the movement of the container between a pair of rollers, one of which is a live rubber wheel while the other is a driven wheel having a sponge rubber surface, such that the container having its concave side facing the live rubber roller and its opposite side engaging the sponge rubber roller turns away from the sponge rubber roller, the forwardly moving end of the container engaging an oppositely driven live rubber roller which moves that forward end of the container in a rearward direction while the sponge rubber roller moves the container, at the opposite end, in a forward direction to properly orient the container. After leaving the orientation area, the container is confined to a generally straight run area by engagement of the neck of the container with a pair of opposed neck guides.

11 Claims, 5 Drawing Figures

CONTAINER ORIENTING APPARATUS

BACKGROUND OF THE INVENTION

This invention relates to the art of arranging articles on a conveyor and more particularly, it relates to apparatus for automatically orienting the paneled portions of a series of flasks in a given direction as they are in transit along a belt conveyor which extends from the glass manufacturing machine to the packing area.

In the manufacture of glass containers, freshly formed containers are subjected to an annealing cycle in which the thermal stresses set up in the glassware is relieved and after the annealing cycle are conveyed usually to an inspection area. After the inspection has taken place, the ware which is found to be acceptable is transported to an off-bearing area which it is usually packed for shipment. Frequently these shipments take place with the ware packed in a carton which has separators to prevent glass-to-glass contact during transport and frequently these cartons will be the ultimate shippers that are used by the user of the glass container in shipping the filled ware to the point of use. When manufacturing non-symmetric containers, such as for example flasks which have opposed concave and convex panels, it is desirable for purposes of efficiency of the overall manufacturing system to supply the containers to the off-bearing area in such a fashion that similar panels on adjacent containers are oriented in the identical direction. This particularly helps in the handling of the ware for purposes of packing the ware in the cartons. Manual reorientaton of the containers at this area merely slows down the actual packing operation and in those instances where mechanical packing machines are used it is imperative that the ware be oriented properly at its arrival at the packing machine.

In view of the foregoing, it is the object of this invention to provide a reliable and durable apparatus of simple construction for properly orienting similarly shaped paneled ware on an outgoing conveyor with the apparatus being automatically operated without the intervention of a human operator to effect the proper orientation.

A preferred embodiment of the invention is herein shown and described and includes a continuously traveling conveyor belt upon which containers which have dissimilar opposed panels are carried in line singly through a zone where the containers are separated from each other a small amount and then are permitted to pass in single line through the orienting device which in those cases where the ware is properly oriented will permit the ware to travel undisturbed through the orienting area. In the event the container arrives at the orienting position with its panels in the wrong directions then the container will be turned through an 180° about its vertical axis while being transported downstream on the moving conveyor. The orientation of the container is carried out in those instances where the container requires turning by the movement of the container between a pair of rollers or wheels one of which is a live rubber wheel while the other, which is driven, is a wheel having a sponge rubber surface. When the container has a concave side facing the sponge rubber roller, it moves with the opposite live rubber roller which engages the concave side and the container generally turns away from the roller which has the sponge rubber side. The forwardly moving end of the container or flask will engage an oppositely driven live rubber roller which tends to move that forward end of the container in a rearward direction while the sponge rubber roller moves the container, at the opposite end, in a forward direction thus rotating the container about its vertical axis through approximately 180° rotation to properly orient the container. After leaving the orientation area, the container is confined to a generally straight run area by engagement of the neck of the container with a pair of opposed neck guides.

SUMMARY OF THE INVENTION

Apparatus for orienting flasks that have non-similar sides by moving the flasks in single line on a conveyor in an upright attitude where the flasks are gated into a turning arrea where they engage an idler roller and two powered rollers when requiring turning and are turned through approximately 180° degrees. Those containers that enter the turning area in the proper orientation engage the idler roller and only one powered roller and pass thereby without being turned.

DETAILED DESCRIPTION OF THE DRAWINGS

In the handling of flasks which typically have a concave and a convex side, it is advantangeous to be able to have them oriented in one direction at the time they are packed in the cases. With this in view, it is an object of this invention to provide apparatus for orienting flasks in one direction as they are moved, single file, along handling equipment at the cold end in a glass plant.

Figure 1:
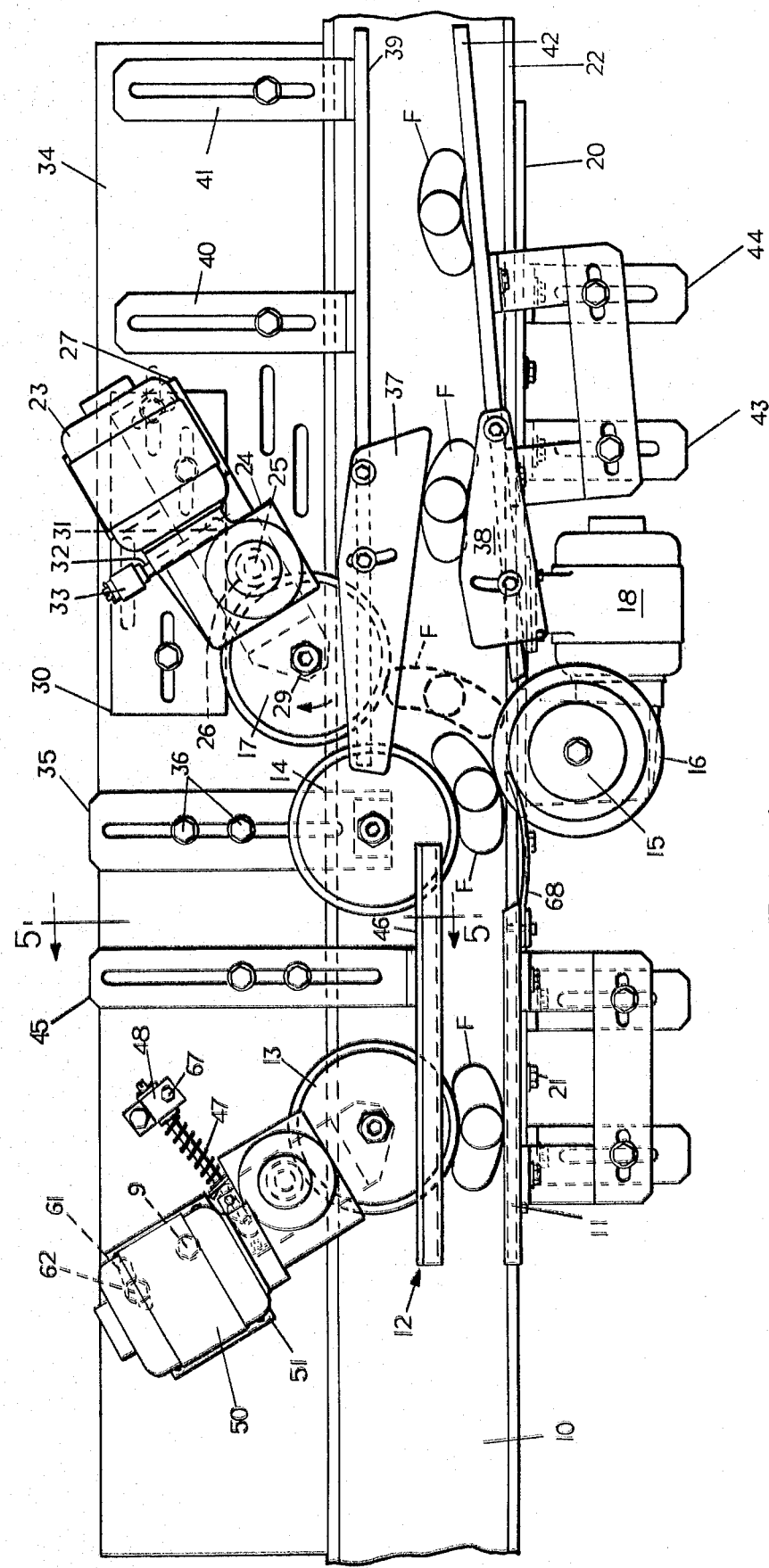
FIG. 1 is a top plan view of the apparatus of the invention.

With particular reference to FIG. 1, which is a top plan view, a horizontal conveyor 10, moving in the direction of the arrow shown thereon, will transport the flasks F from left to right, as viewed in the Figure.

Figure 2:
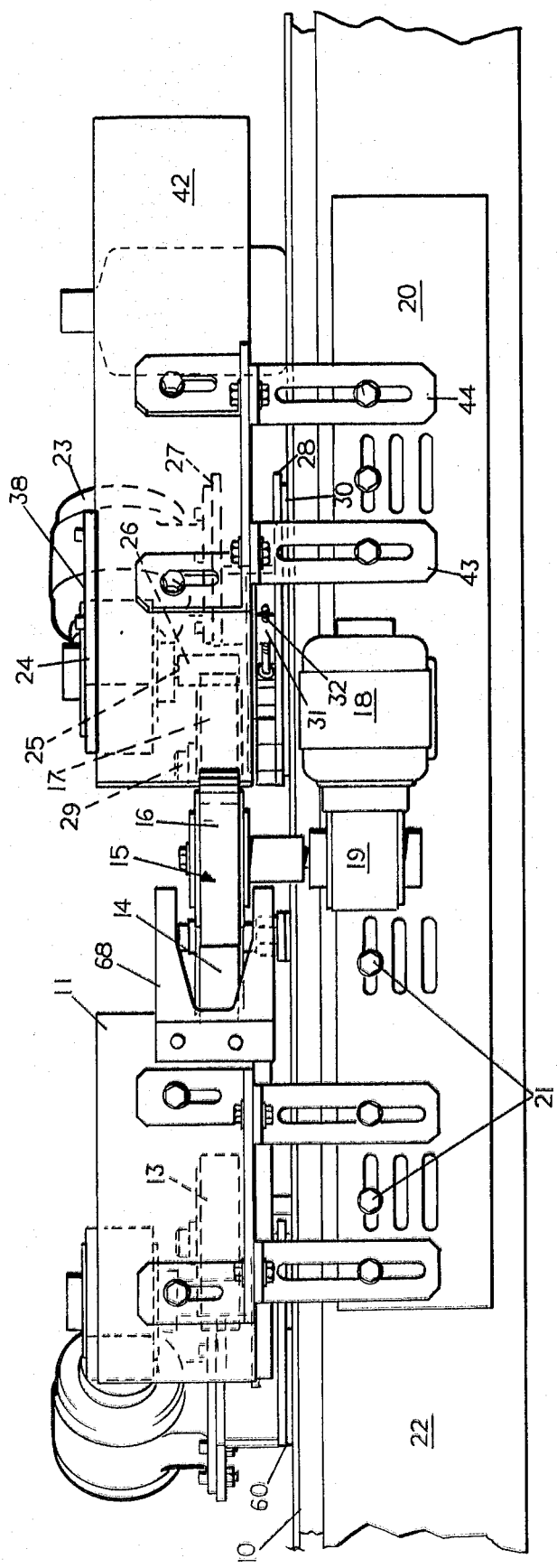
FIG. 2 is a side elevational view of the apparatus of FIG. 1.

With reference to FIG. 2 also, it can be seen that as the flasks move from the left, they will be engaged by a guide plate 11 and, generally, guided by a dual rail, oppositely positioned guide 12. The flasks are individually confined between the guide 11 and a rotating wheel 13. Generally speaking, the rotating wheel 13 is spring biased about a pivot 9, to be described in greater detail with reference to FIG. 3. As the bottles pass the rotating wheel 13, they will be gated, in effect into the orienting section of the mechanism which begins with a roller 14. The roller 14 is an idler roller in the sense that it is not driven and is free to rotate about its vertical axis. On the near side of the conveyor 12, in opposition to the roller 14, is positioned a roller 15. The roller 15 is provided with a spongy surface, such as sponge rubber or equivalent surface material 16 which will give when engaged by the end of the flask when in the position shown in dotted line in FIG. 1.

In the dotted line position in FIG. 1, the flask will have passed between the roller 15 and roller 14, and with the concave side in the direction as shown in full line between the two rollers, the flask will then move to the position shown in dotted line at which time the trailing portion of the flask will be engaged by the roller 15 and become compressed into the surface 16 of this roller. The opposite end of the flask, as shown in dotted line, will be engaged with a third roller 17. The roller 17, as viewed in FIG. 1, is driven in a clockwise direction, while the roller 15 is likewise rotated in a clockwise direction. The roller 15 is geared to a motor 18 through a gear box 19.

As can be seen in FIG. 2, the motor 18 is mounted to a vertically positioned, horizontally extending, plate 20 which in turn is bolted by bolts 21 to the side 22 of the conveyor 10. The roller 17 is driven by a motor 23 through a gear box 24, whose output shaft 25 carries a cylinderical drive member 26. The cylinderical drive member 26 is positioned in frictional engagement with the periphery of the wheel 17. It being understood that the wheel 17 has its exterior surface formed with a relative hard rubber-like material, and that the member 26 of a compatable material will engage the side of the wheel 17 and upon rotation of the member 26, the wheel 17 will be rotated in the direction of the arrow shown thereon in FIG. 1.

The motor 23 is mounted on a horizontal platform 27. The platform 27 is welded to or fixed in relationship with a further horizontally extending plate 28. The plate 28 extends to and beneath the pivot axis 29 of the wheel 17 and serves as the mounting for the axis 29 of the wheel 17. The plate 28 may be adjustably positioned relative to a base plate 30 by shifting a post 31. The post 31 actually extends through an elongated slot in the plate 28 while its upper end is fastened to the motor platform 27. Thus, the motor platform may be shifted relative to the base plate 30 and this is provided for by an elongated threaded member 32, which is threaded diametrically through the center of the post 31. The outer end of the threaded member 32 is carried in a bushing member 33 that is fixed to a horizontal base platform 34. The platform 34 extends, generally, in parallel relationship with respect to the top of the conveyor 10 and extends outwardly, as best shown in FIG. 1, and serves to support the motor 23 and other members which are mounted on the same side of the conveyor as the wheel 17. The base plate 30 mounts to the base platform 34 through elongated slots such that the motor and its mount 27, along with the plate 28, may be shifted horizontally so as to position the wheel 17 relative to the wheel 15 to provide for different sized flasks being handled.

As best seen in FIG. 1, the platform 34 carries a bracket 35, which has an elongated slot therein through which bolts 36 extend, providing for some adjustment of the bracket 35 relative to the platform 34. The bracket 35 extends, at its one end, over the conveyor 10 and at this extending end provides the support for the pivot for the wheel 14. Thus, it can be seen that the bracket 35 and the wheel 14 may be shifted toward or away from the conveyor 10. Here again, this provides for an adjustment, for the handling of different size ware, during the initial setup of the mechanism for handling the particular flasks. After the flasks have passed by the oriented area between the wheels 15 and 17, they are guided at their neck area by a pair of spaced neck guides 37 and 38. Guide 37 is adjustably mounted to the upper edge of a guide plate 39. The guide plate 39 is mounted to the base platform 34 by a pair of brackets 40 and 41. These brackets 40 and 41 are slotted so as to provide horizontal adjustment of the bracket relative to the platform 34. Thus, providing lateral adjustability for the guide plate 39.

In opposing relationship to the guide plate 39 is a guide plate 42. The guide plate 42 serves also as an adjustable mount at its upper surface or edge for the neck guide 38. The guide plate 42, as best shown in FIG. 1 extends from closely adjacent to the periphery of the wheel 15 to a considerable distance downstream of the conveyor 10. It should be noted that the guide plate 42 is angled and this angle is so as to insure that flasks which have been turned, or ones which have been passed through without turning, will assume a generally consistent position on the conveyor 10, adjacent the center thereof, and that the orientation of the flask will be consistent as they pass out of the influence of the orienter. The angle of the guide plate 42 is adjustable, as can be seen when viewing FIG. 1, as well as its height relative to the conveyor surface, and to the plate 20 to which it is connected by brackets 43 and 44. The brackets 43 and 44 are I-shaped and in both the vertical legs as well as the horizontal legs thereof are provided with extending slots through which mounting bolts are inserted.

Figure 5:
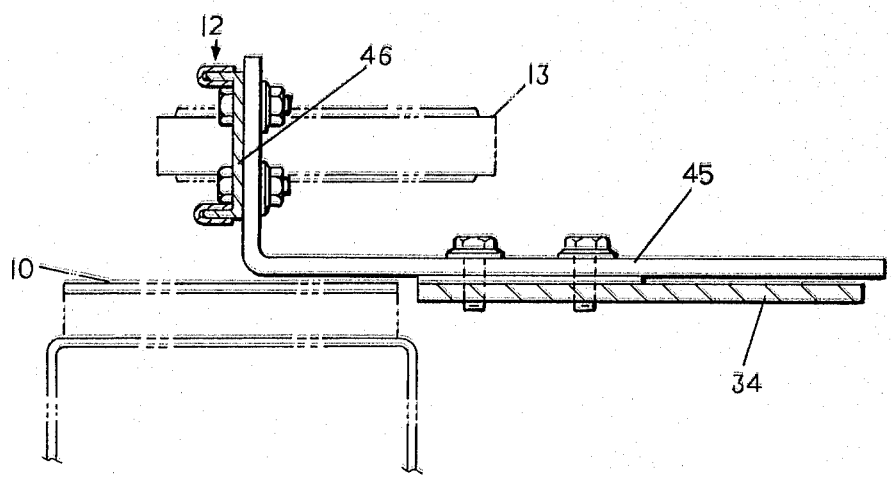

With reference to FIG. 5, it can be seen that the base platform 34 carries an angle bracket 45 bolted thereto through a horizontal slot formed along the length thereof. The bracket 45 has a vertical end to which a generally U-shaped horizontally extending member 46 is bolted. The member 46 has its horizontally extending edges covered with a material which will not scratch glass containers, such as teflon or nylon, and this member 46 with its ribs serves as the dual rail 12 that is positioned in opposing relationship with rail 11 previously described. This is located at the incoming end of the orienting system and a gap therein provides space for a portion of the roller 13 to extend therethrough and engage flasks. The bottles or flasks as they enter the area between the roller 13 and the guide rail 11 are gated toward the right, as viewed in FIG. 1, so as to separate the flasks prior to their entry into the orienting area. This gating is accomplished by the rotation of the wheel in the direction of the arrow shown, at a suitable velocity relative to the velocity of the moving conveyor 10. The wheel 13, as previously explained, is biased by a spring 47 which extends between a stationary mounting block 48 and a rounded surface 49 of the motor and wheel mounting plate for a motor 50 which is used to drive the wheel 13.

Figure 3:
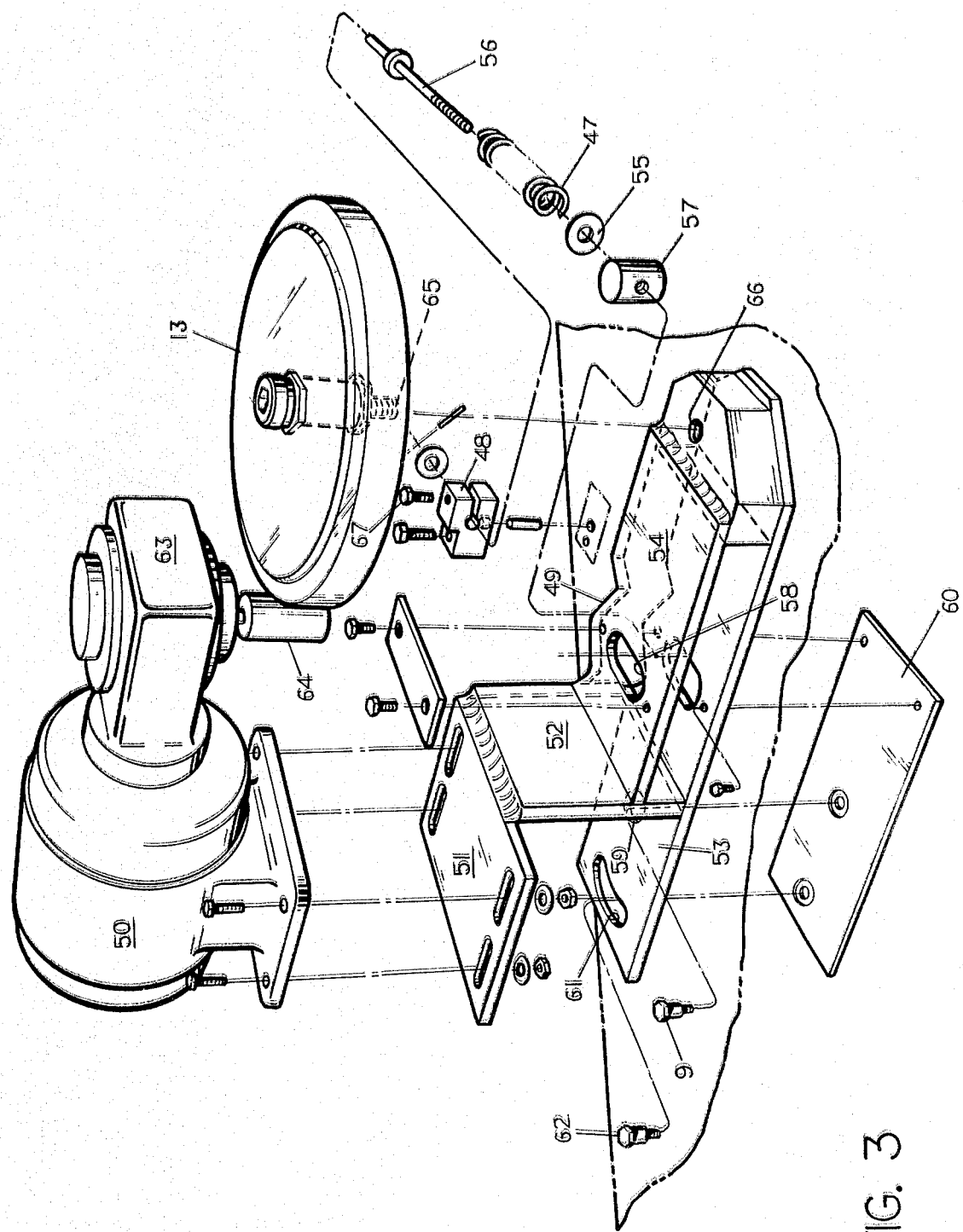
FIG. 3 is an exploded, perspective view of the gating wheel and its drive motor.
Figure 4:
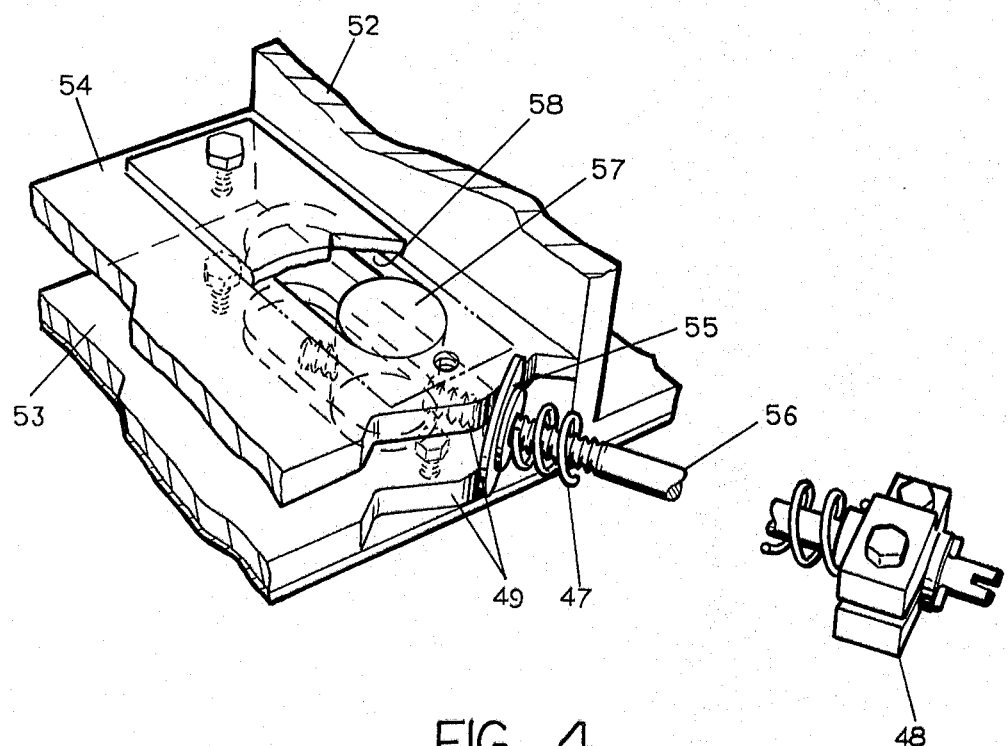
FIG. 4 is an assembled perspective view of the gating wheel spring bias and stop position adjustment mechanism and, FIG. 5 is a partial cross-sectional view taken at line 5—5 of FIG. 1.

With particular reference to FIGS. 3 and 4, wherein the system of supporting the motor 50 is shown in detail, it can be seen that the motor 50 is mounted to a platform 51. The platform 51 is welded to an upper end of a vertical plate 52. The lower end of the vertical plate 52 is welded to a horizontally extending plate member 53. The plate member 53, along with a parallel plate member 54, carry at their edge the round surface 49 against which the spring 47 abutts through the interpositioning of a washer 55. Extending from the block 48, through the spring 47 and washer 55, is a threaded adjusting shaft 56. Shaft 56 threads through a pillow block or post 57 which is positioned within an elongated slot 58 in the plate 54 and a complementary identical slot that's formed in the lower, horizontal plate member 53. Thus, it can be seen that the pillow block, in effect, forms the stop for the spring biased mounting system for the motor 50.

As best seen in FIG. 3, the lower mounting plate member 53 is provided with a hole 59 within which the pivot pin 9 extends, it being realized that the pivot pin 9 is threaded into a plate 60, which in turn is bolted to the platform 34. The horizontal plate member 53, is also shown as having an arcuate slot 61 formed therein and through this slot 61 is positioned a shoulder bolt 62. The shoulder bolts 62 and 9 are the type which will thread down into the plate 60 and may be tightened with respect to plate 60, however, their heads will not bind against the plate 53. Thus, it can be seen that the plate 53, the motor 50 and the wheel 13 which it will drive, can all pivot about the shoulder bolt 9, at least to the extent permitted by the slot 61.

As can be seen in FIG. 3, the motor 50, through a gear box 63, will drive a roller 64 which has its periphery in engagement with the outer surface of the wheel 13. It being understood that the wheel 13 rotates about its axle 65. The axle 65, as a matter of fact, is threaded into the threaded hole 66 at the forward end of the plate 53, the block that has the threaded hole is joined with the forward edge of plate 54. As previously explained, the spring 47, and as shown in detail in FIG. 4, biases the plates 53 and 54 in such a direction that the block 57 will engage the right hand end of the slot 58 formed in the plate 54. However, when the roller or wheel 13 engages a flask F as it moves from the left to the right, as viewed in FIG. 1, the wheel 13 may pivot about the pivot pin or shoulder bolt 9 and at this time the spring 47 will be compressed and the block 57 will move relative to the plate 54 along the length of the slot 58. Once the flask gets past by the wheel 13, the wheel and its motor mount will move back to the end position where the block 57 engages the right hand end of the slot 58. When the stop position of the block 57 is adjusted, it is accomplished by the loosening of a bolt 67, which extends through the block 48 and rotation of the threaded shaft 56. The adjustment of the position of the wheel 13 relative to the backup plate 11, is necessary when the apparatus is being reset for handling of a flask that has a larger or smaller lateral dimension. It should be pointed out that after the adjustment of the threaded shaft 56 is made, the bolt 67 will be retightened to clamp the threaded shaft 56 in the adjusted position.

In accordance with the foregoing description, it can be seen that a flask, moving from left to right, as used in FIG. 1, will be gated initially by the wheel or roller 13 through the area between the rail 12 and guide rail 11, and as it approaches the gap or nip between the wheel 16 and wheel 14, it will move either counterclockwise or upwardly, as viewed in FIG. 1 if its concave side is facing the idler roll 14 and then be turned about its vertical axis through approximately 180° by the simultaneous engagement between the wheel 15 and the wheel 17, and after this it passes through the gap between the neck guides 37 and 38 and then may come into engagement with the guide wall 42. In those situations where the bottle is properly oriented at the time that it arrives at the orienting apparatus, it will pass through the gate provided by the wheel 13 and then as it is engaged by the roller 15, and its spongy surface 16, and the roll 14, it will not turn upwardly, as viewed in FIG. 1, but will continue, generally, in a straight line, since its concave side will be toward the roll or wheel 15, and then it will proceed through the gap between the neck guides 37 and 38, and then assume the position of the flask as shown in engagement with the wall 42. It should be pointed out, that the end of the guide 11 extends to the area just overlapping the circumference of the roller 16. This area is provided by a bifurcated extension 68, which can be seen when viewing FIG. 1, is of a concave or bent configuration so as to provide clearance between the trailing edge of the bottle or flask as it is moving between the roller 15 and roller 14. However, it does prevent the bottle or flask from deviating generally from the line of movement toward the area between the two rollers 15 and 14 and its right end has portions that extend above and below the roller 15.

Thus, it can be seen with the above-described apparatus that flasks, as they are moved along on a conveyor, will be oriented after passing through the orienting system, all with their concave side facing the same direction. And as previously explained, this provides great assistance in the packing of the ware in cartons preparatory to shipping to a filler, who will take the container and fill it with product to be sold. This is particular advantageous in some instances where the filler has, what is termed, "an automatic case unloader," which will automatically pick the containers from the cartons and place them in line to pass through a filling machine. In this instance, it is very necessary that the filling machine be loaded with the flasks all oriented in the same direction, and in the event the flasks were not packed in the proper attitude, obviously, they would come out of the carton and be oriented in the case unpacker in the same manner in which they are taken from the carton resulting in the misoriented flask entering the filling equipment in the wrong attitude. Some filling equipment will experience a breakdown when this occurs and result in an interruption of the filling line. This, of course, is time consuming and for that reason the present invention is believed to have significant utility in the handling of ware of the flask type.

I claim:

1. Apparatus for orienting flasks having opposed concave and convex panels, comprising a horizontal conveyor for moving flasks in an upright attitude in generally single file, first guide means extending along one side and generally parallel to the edge of said conveyor for guiding the flasks in their movement on the conveyor, a first driven horizontal roller overlying the edge of said conveyor, downstream of said first guide means, for engaging one side of the flask, a second idler roller in generally opposed relationship to said first roller for engaging the opposite side of said flask and advancing the flask on the conveyor in a first direction when the concave side of the flask engages the idler roller and in a second direction when the convex side engages the idler roller, a third driven roller offset downstream of the idler roller and spaced from said first driven roller a distance slightly less than the length of the flask, means rotating said third roller at a surface velocity slower than the surface velocity of said first driven roller, whereby a flask that has its concave side engaged by the idler roller is turned through 180° by simultaneous engagement between said driven rollers.

2. The apparatus of claim 1 wherein said first driven roller has a spongy surface.

3. The apparatus of claim 1 further including means engaging the neck of the flask thereby steadying said flask after its movement past said driven rollers.

4. The apparatus of claim 3 wherein said means for guiding the neck of the flask comprises a pair of opposed neck guide members positioned above the level of the rollers in spaced apart alignment with the neck of the flask.

5. The apparatus of claim 1 further including, second horizontal guide means extending in opposing relation to said first guide means.

6. The apparatus of claim 5 wherein said second guide means comprises an elongated bar having a pair of outstanding horizontal edges forming a pair of vertically spaced, flask engaging rails.

7. The apparatus of claim 6 wherein said bar has a horizontal gap therein between said rails, and fourth driven roller means mounted for rotation about a vertical axis with a portion of the roller periphery extending through the gap in said bar.

8. The apparatus of claim 7 wherein said fourth driven roller is spaced from said first guide an amount that is slightly less than the width of the flask being oriented means mounting said fourth roller for limited movement relative to said bar, and means biasing said roller toward the first guide means.

9. The apparatus of claim 8 wherein said fourth driven roller is driven at a peripheral velocity relative to the speed of the moving conveyor so as to space the flasks into the orienting mechanism.

10. The apparatus of claim 1 further including a bifurcated guide member extending from the trailing edge of said first guide means and having its ends extending above and below the flask engaging surface of said first driven roller.

11. The apparatus of claim 10 wherein said extending ends of said bifurcated member are curved from a direction generally parallel to the edge of the conveyor to an inward curvature approximating the contour of the idler roller.

* * * * *